United States Patent [19]
Liu

[11] Patent Number: 6,073,765
[45] Date of Patent: Jun. 13, 2000

[54] PLANAR HOLDER FOR MULTIPLE COMPONENTS AND METHOD

[76] Inventor: Nicholas Nien-Shiang Liu, 14619 Woonsockett Dr., Silver Spring, Md. 20905

[21] Appl. No.: 09/151,352

[22] Filed: Sep. 10, 1998

Related U.S. Application Data

[60] Provisional application No. 60/070,584, Jan. 6, 1998.

[51] Int. Cl.$^7$ .................................................. B65D 85/57
[52] U.S. Cl. .................................... 206/308.3; 206/425
[58] Field of Search .................................... 206/425, 485, 206/308.3, 308.1, 453, 586, 456; 281/2–4, 38, 43; 425/542; 264/523

[56] References Cited

U.S. PATENT DOCUMENTS

| | | | |
|---|---|---|---|
| 4,676,374 | 6/1987 | Wilkins | 206/308.3 |
| 4,724,956 | 2/1988 | Ozeki | 206/308.3 |
| 4,860,897 | 8/1989 | Fowler et al. | 206/308.3 |
| 5,226,537 | 7/1993 | Ozeki | 206/456 |
| 5,518,112 | 5/1996 | Ono et al. | 206/425 |
| 5,638,952 | 6/1997 | Kim | 206/308.3 |
| 5,699,905 | 12/1997 | Hara | 206/308.3 |
| 5,772,020 | 6/1998 | Hara | 206/308.3 |

OTHER PUBLICATIONS

Staples Orders Catalog 1998–1999, Media Management (Computer), p. 433, File Folder, p. 559.

*Primary Examiner*—Paul T. Sewell
*Assistant Examiner*—Luan K. Bui
*Attorney, Agent, or Firm*—Nixon & Vanderhye P.C.

[57] ABSTRACT

A planar holder supports multiple components such as computer diskettes, ZIP drive disks, compact disks and the like for convenient storage and filing in a conventional three-ring binder, hanging file or other suitable filing product. The planar holder includes a plastic molded frame having a front side and a rear side and a holding mechanism formed integral with the frame. The holding mechanism respectively supports the plurality of components on the front side and the rear side of the frame. In one arrangement, a plurality of flexible catches and fixed catches are formed integral with the frame and are configured to support computer diskettes and/or ZIP drive disks and the like. In another arrangement, the catches are disposed in a substantially circular orientation for engagement with a circular central aperture in a compact disk. The holder is manufactured by injection molding in a single process step.

11 Claims, 5 Drawing Sheets

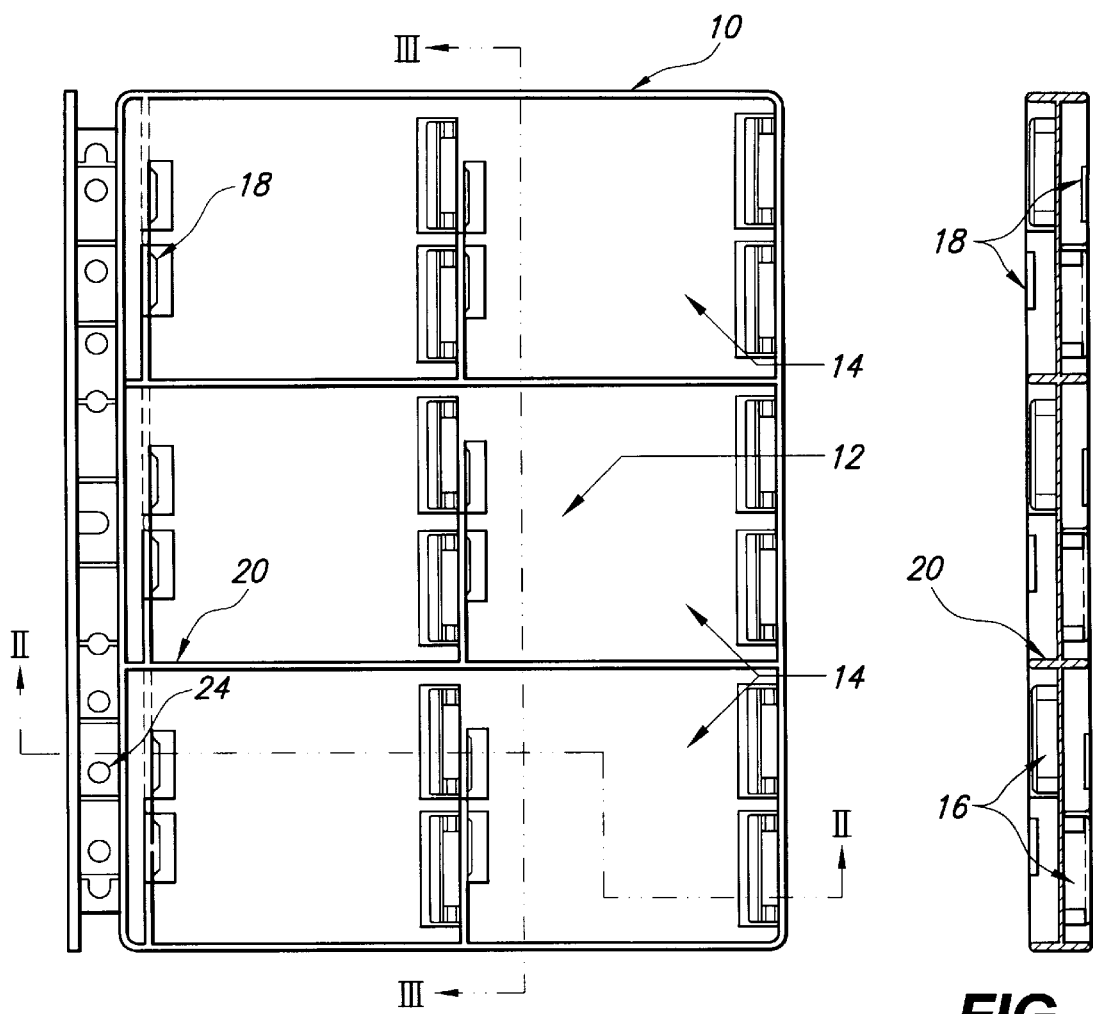
FIG. 1
FIG. 3
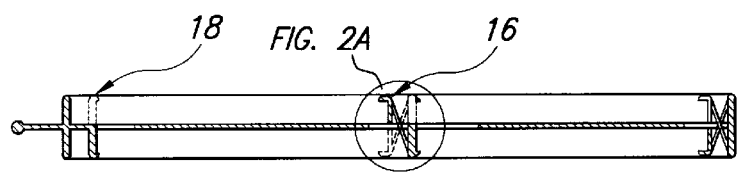
FIG. 2
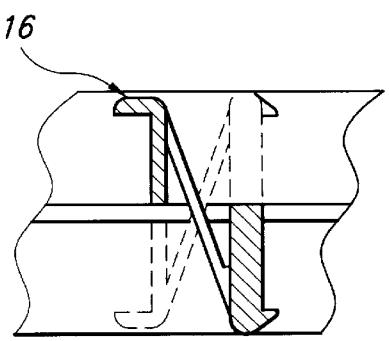
FIG. 2A

PLANAR HOLDER FOR MULTIPLE COMPONENTS AND METHOD

This application claims the benefit of U.S. Provisional Application Ser. No. 60/070,584, filed Jan. 6, 1998.

BACKGROUND OF THE INVENTION

The present invention relates to products for filing multiple components such as computer diskettes, ZIP drive disks, compact disks (CD ROM) and the like and, more particularly, to a planar holder formed of a one-piece plastic molded frame incorporating structure for supporting multiple components.

In a conventional multiple component storage product for computer diskettes, ZIP drive disks, compact disks and the like, the components are typically stored in a stacked horizontal column or, in the case of compact disks, in a stacked relationship in a rack or the like. In this manner, in order to locate a particular component, each component must be flipped or scanned one at a time. In this stacked-type relationship, it is typical to view only a single component label at one time. Consequently, particularly in the case of large component collections, it is difficult to quickly locate the desired component.

Moreover, the stacked component storage requires significant storage space. These space requirements are not suitable for portability or conventional filing products.

SUMMARY OF THE INVENTION

It is therefore an object of the present invention to provide a planar holder and method of its manufacture for supporting multiple computer diskettes, ZIP drive disks, compact disks and the like that overcome the drawbacks noted with respect to conventional products. It is another object of the invention to provide a planar holder that can be manufactured simply and inexpensively.

To achieve these and other objectives, the planar holder according to the invention is a one-piece, injection molded integrated holder that is configured for storing multiple computer diskettes, ZIP drive disks, compact disks or the like. The planar holder is configured with two sets of compartments for holding the disks, one set on each side of the frame. In preferred forms, each planar holder for conventional disks, such as for example, computer diskettes or ZIP drive disks, can hold twelve to twenty-four components and from compact disks and the like can hold four components. The holder is preferably made of plastic, such as for example polypropylene plastic, which material has elastic properties that enable the holding mechanism to hold the disks securely in place while allowing the disks to be readily removed. The holders may also be provided with a filing component, such as hanging file hooks or binder apertures formed integral with the frame. As such, the holders can be conveniently filed and organized in a standard three-ring binder, a hanging file drawer, or the like.

In accordance with one preferred aspect of the invention, there is provided a planar holder for a plurality of components including a plastic molded frame having a front side and a rear side and a holding mechanism formed integral with the frame. The holding mechanism respectively supports the plurality of components on the front side and the rear side of the frame.

In accordance with another aspect of the invention, there is provided a method of manufacturing the planar holder according to the present invention. The method includes the steps of injection molding a frame including a front side and a rear side, and forming a holding mechanism integral with the frame, which holding mechanism is formed to respectively support the plurality of components on the front side and the rear side of the frame.

In accordance with still another aspect of the invention, there is provided a planar holder for supporting a plurality of components including computer diskettes, ZIP drive disks or compact disks. The planar holder includes a plastic molded frame having a front side and a rear side, and a plurality of compartments on the front side and the rear side of the frame, wherein the compartments are defined by at least one of catches and securing ridges disposed on the front side and the rear side of the frame. The compartments are preferably shaped corresponding to the plurality of components.

BRIEF DESCRIPTION OF THE DRAWINGS

These and other aspects and advantages of the present invention will be described in detail in the following detailed description of preferred embodiments with reference to the accompanying drawings, in which:

FIG. 1 is a top plan view of the planar holder according to the present invention;

FIG. 2 is a cross-sectional view through the line II—II in FIG. 1;

FIG. 2A is a detailed view of a flexible catch;

FIG. 3 is a cross-sectional view through the line III—III in FIG. 1;

DETAILED DESCRIPTION OF PREFERRED EMBODIMENTS

Figure 4:
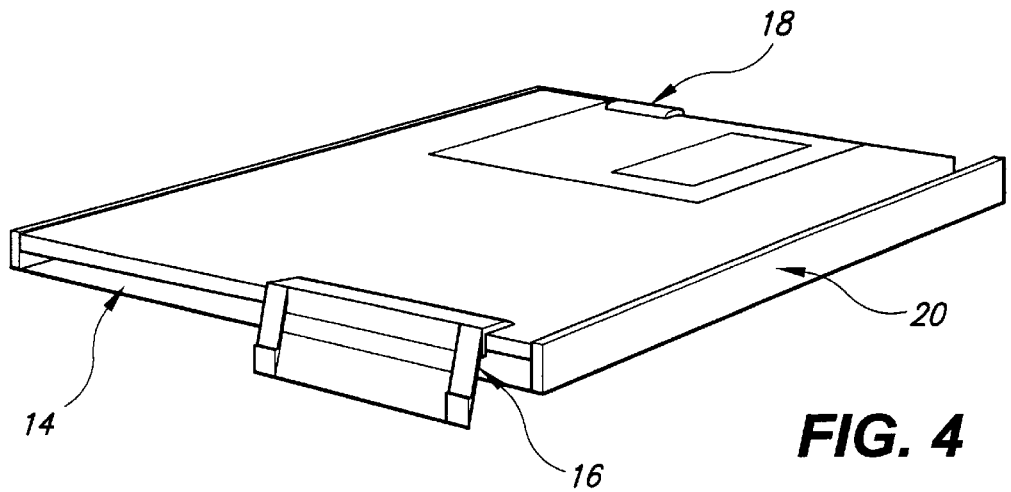
FIG. 4 is a perspective view of a compartment in a first embodiment of the invention.

FIG. 1 illustrates a planar holder according to a first embodiment of the invention. The holder 10 is preferably formed by injection molding using polypropylene or like moldable material. Of course, other forming processes and materials can be used to manufacture the structure according to the present invention, and the invention is not meant to be limited to the described method and material. Another particularly suitable material for the holder according to the invention is nylon. Moreover, the holder can be plated with metal to eliminate static electricity.

The holder 10 consists of a plastic molded frame 12 having a front side and a rear side. A plurality of holding mechanisms or compartments 14 are defined by a configuration of catches 16, 18 and supporting ridges 20 as shown. In a preferred embodiment, each side of the frame includes six compartments 14 as shown.

With reference to FIGS. 2 and 3, the compartments 14 including catches 16, 18 and supporting ridges 20 are disposed on the front side and the rear side of the frame 12. To facilitate manufacturing, the front side catches 16, 18 and the rear side catches 16, 18 are alternately positioned as shown in FIG. 3.

Figure 5:
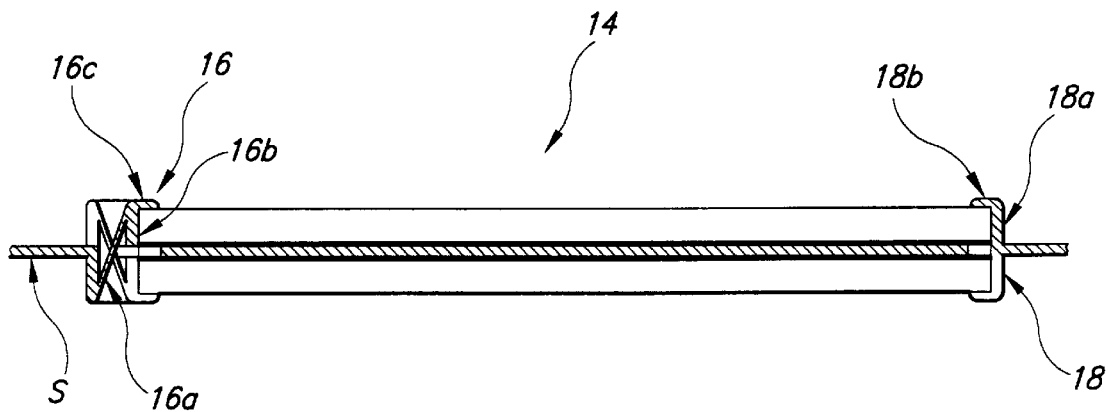
FIG. 5 is a side view of the compartment illustrated in FIG. 4.

FIGS. 4 and 5 illustrate the structure of the compartments 14 in greater detail along with a computer diskette mounted therein. Each compartment 14 preferably includes at least one flexible catch 16 and at least one fixed catch 18. The catches 16, 18 are positioned along parallel sides of the compartment 14 in a spaced and facing relationship as shown in FIG. 4 for supporting at least one component between them. The supporting ridges 20 are disposed along sides of the compartment 14 substantially perpendicular to the parallel sides corresponding to the catches 16, 18. With this arrangement, the compartments 14 are preferably shaped substantially corresponding to the supported component such that the component can be securely held.

Referring to FIG. 5 and FIG. 2A, each flexible catch 16 includes a flexible extension 16a, a component securing panel 16b, and a securing ridge 16c. As illustrated, the flexible extension 16a extends from a surface S of the frame 12 toward one side of the frame, then toward the opposite side of the frame through an aperture in the surface and beyond the opposite side. The component securing panel 16b is attached to the flexible extension 16a and is disposed in a facing relationship with a corresponding fixed catch 18 of the compartment. The securing ridge 16c is formed at the junction between the flexible extension 16a and the component securing panel 16b and is spaced from the surface S of the frame 12 a distance corresponding to a width of at least one component. Of course, this distance can be configured to enable each compartment to support any desired number of components. This arrangement of the flexible catches 16 takes advantage of the slightly elastic nature of the plastic material. The fixed catches 18 include a support panel 18a extending from the surface S of the frame 12. The fixed catches 18 similarly include securing ridges 18b spaced from the frame. With this construction, the flexible catches 16 can be readily flexed relative to the frame, whereas the fixed catches 18 are more rigidly constructed and resist flexing relative to the frame.

Figure 6:
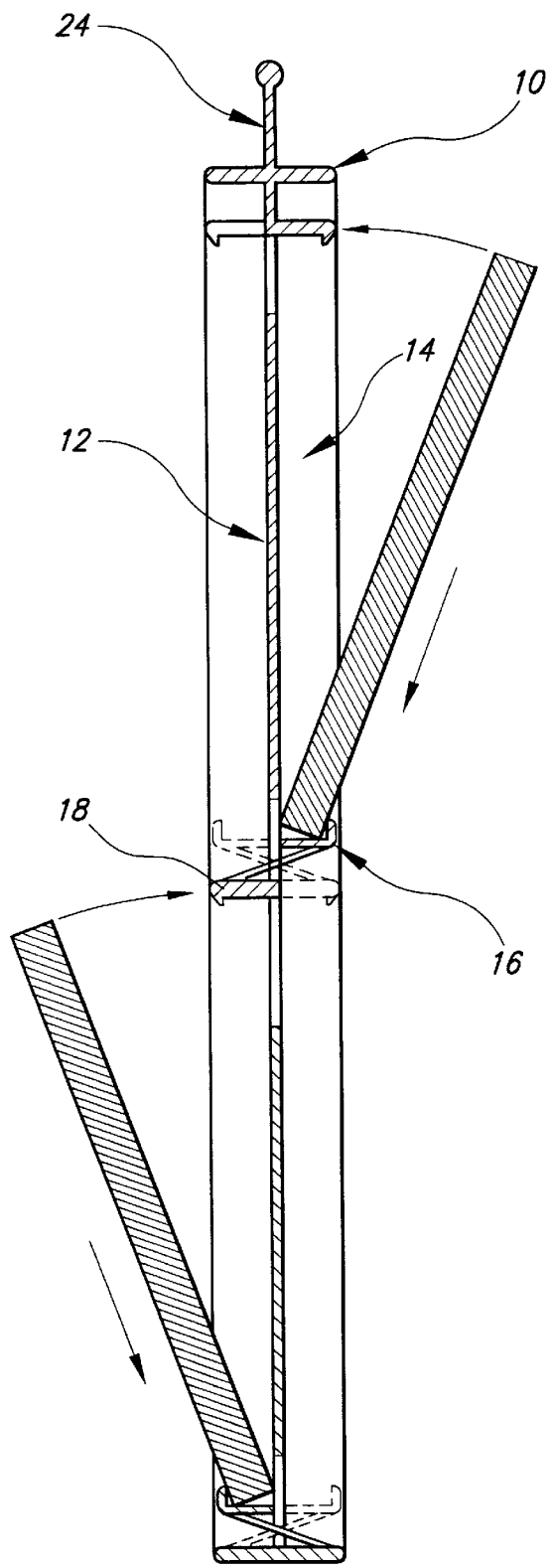
FIG. 6 illustrates the manner in which diskettes are inserted into respective compartments.

In this embodiment, to store a diskette or the like, referring to FIG. 6, the diskette is positioned under one of the flexible catches 16 and is gently pushed down on the other side. By virtue of the elastic and spring properties of the plastic material, the flexible catches 16 will flex slightly to allow the diskette to be positioned underneath the securing ridge 18b of the fixed catches 18 after which the flexible catches 16 spring back to hold the diskette securely in place. Retrieval of the diskette is equally simplified. The diskette is urged against the flexible catches 16 until it clears the securing ridges 18b of the fixed catches 18, and the diskette can be thus lifted out of the compartment 14.

In preferred forms, the planar holder is additionally provided with at least one filing component 24 formed integral with the frame 12. The filing component can be any number of integrally formed components for facilitating filing of the planar holder. As shown in FIG. 1, one example of a filing component is binder apertures formed in the frame and spaced for insertion into a multi-ring binder, such as a three-ring binder or the like. Other examples include hanging file hooks disposed at opposite ends of the frame, pegs for insertion into a supporting rack or the like, etc.

Figure 7:
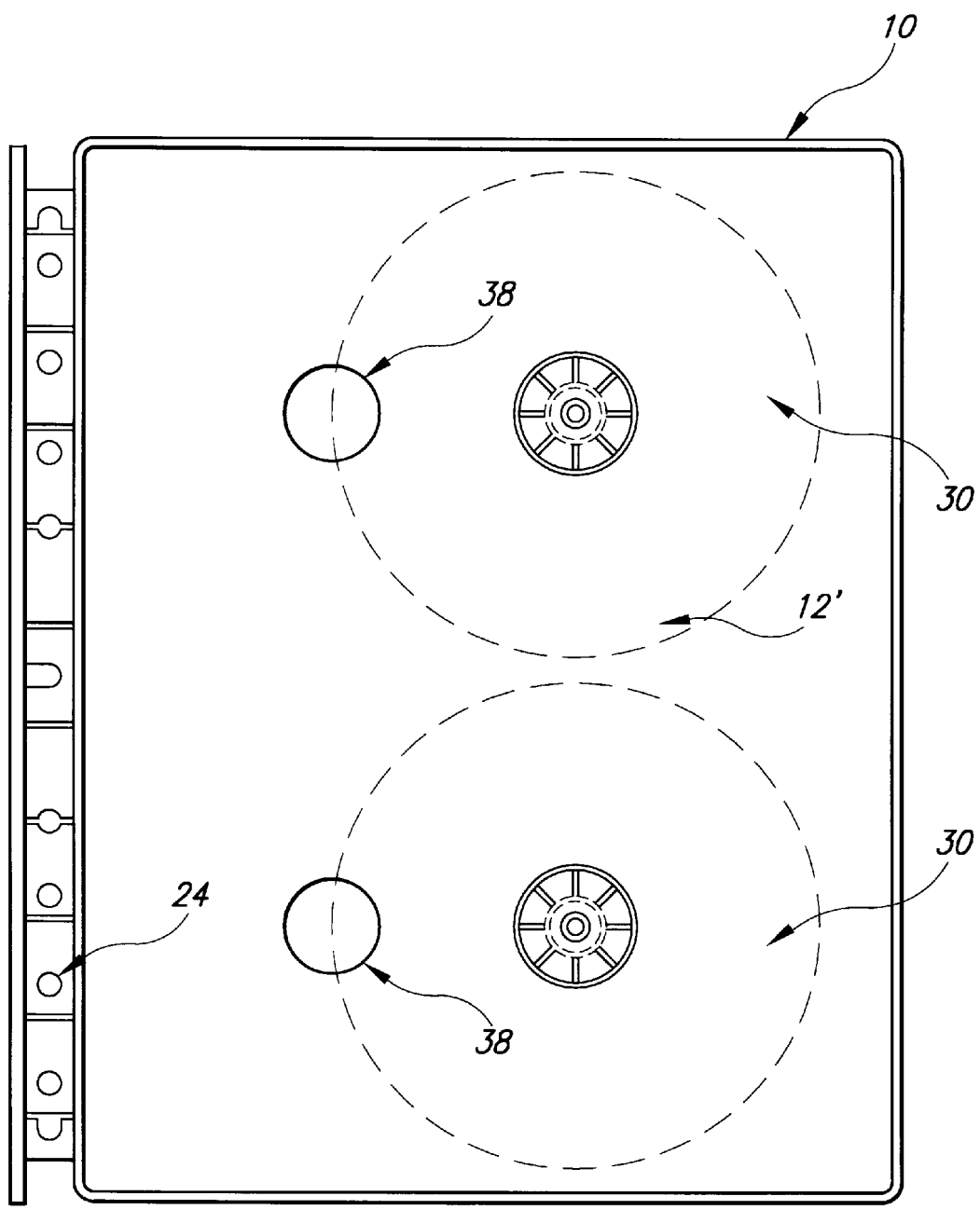
FIG. 7 is a top plan view of a planar holder according to another embodiment of the invention.

FIG. 7 illustrates a planar holder according to an alternative embodiment of the present invention. This embodiment is particularly configured for supporting circular disks having a central opening such as compact disks. In this embodiment, the frame 12' is preferably provided with two compartments 30 on each of the front and rear sides.

Figure 8:
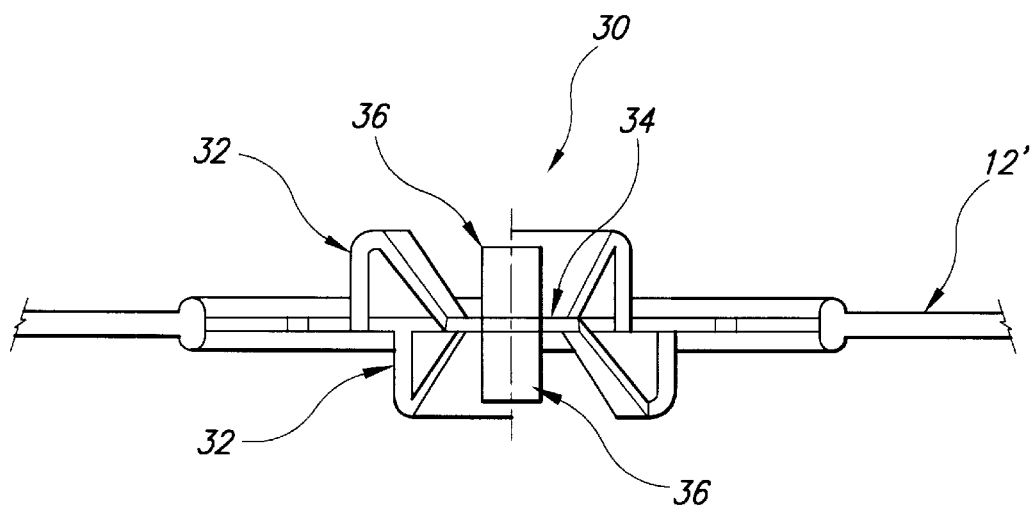
FIG. 8 is a cross-sectional view of a compartment in the embodiment of FIG. 7.
Figure 9:
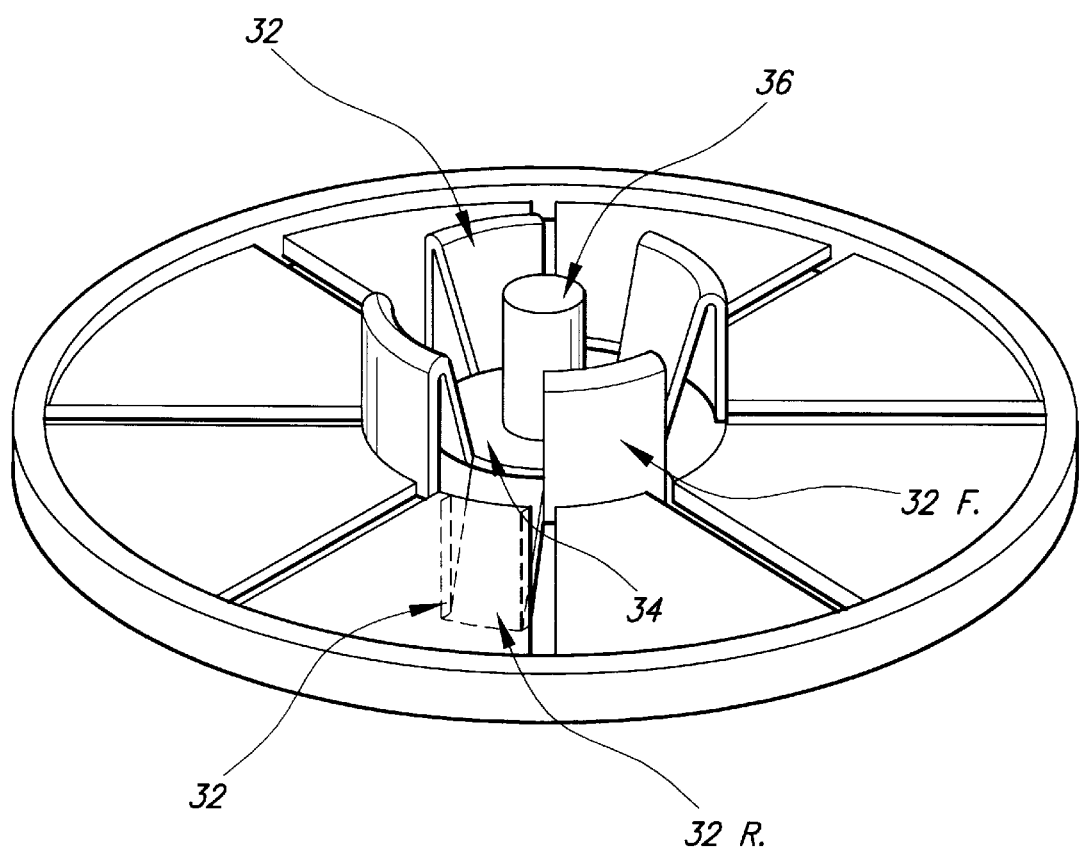
FIG. 9 is a perspective view of a compartment in the embodiment of FIG. 7.

FIGS. 8 and 9 illustrate the compartment 30 according to this embodiment of the invention in more detail. The compartment 30 includes a plurality of flexible catches 32 arranged in a substantially circular orientation at 90° intervals on the front and rear side of the frame 12'. Of course, although four catches 32 are shown on each side of the frame, more or fewer catches may be provided, and the invention is not meant to be limited to the illustrated example. It is preferable to position the apertures evenly about the circular orientation.

As shown in FIG. 9, the front side catches and rear side catches are disposed about the perimeter of a release button disk 34 in an alternating configuration. That is, a flexible catch 32R of a rear side compartment, for example, is alternately disposed between flexible catches 32F of a front side compartment relative to the release button disk perimeter. First and second release buttons 36 are attached to the release button disk 34 and extend in opposite directions on opposite sides of the release button disk 34. The release buttons 36 are attached to each of the catches 32 via the release button disks 34. The catches 32 are attached at opposite ends of the frame 12' as shown in FIG. 9.

In operation, to store a compact disk, the center aperture of the compact disk is aligned with a holding mechanism or compartment 30 of the planar holder and is gently pushed down. By virtue of the elastic properties of the plastic material, the flexible catches 32 will flex slightly to allow the compact disk to fit completely in the compartment 30. When the disk is released, the flexible catches 32 spring back to hold the disk securely in place.

To retrieve the disk, a user can utilize finger holes 38 in the frame 12' (FIG. 7) to support the holder while pressing a release button 36. As the release button 36 is pressed, the flexible catches are deflected concentrically inward toward a release position by the release button disk 34 thus enabling the disk to be lifted out of the compartment. At the same time, the catches on the opposite side of the frame are deflected concentrically outwardly further securing the opposite side components during the removal operation.

By virtue of the structure according to the present invention, a convenient holder is provided for filing and storing multiple components such as computer diskettes, ZIP drive disks, compact disks and the like. Because the holder can be injection molded in a single processing step, manufacturing cost and complexity are minimized. The holder can be adapted for insertion into a three-ring binder, a hanging file or other convenient storage device. Additionally, because the labels of the storage components are readily visible, a user can easily locate a desired component.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A planar holder for a plurality of components, the planar holder comprising a molded frame having a front side and a rear side, and a holding mechanism formed integral with the frame for supporting the plurality of components on the front side and the rear side of the frame, wherein the holding mechanism comprises a plurality of catches disposed on the front side and the rear side of the frame, and wherein respective pairs of the catches are spaced apart to support respective ones of the components, each pair of the catches including a flexible catch and a fixed catch, wherein each flexible catch comprises a flexible extension and a component securing panel, the component securing panel being attached to the flexible extension and disposed in a facing relationship with a corresponding fixed catch, wherein the flexible extension for a front side component extends from a surface of the frame toward the rear side, then toward the front side through an aperture in the surface of the frame and beyond the front side, and wherein the flexible extension for a rear side component extends from the surface of the frame toward the front side, then toward the rear side through an aperture in the surface of the frame and beyond the rear side.

2. A planar holder according to claim 1, wherein each fixed catch comprises a support panel extending from a surface of the frame.

3. A planar holder according to claim 1, wherein each flexible catch is flexibly secured to the frame, and wherein each fixed catch is rigidly secured to the frame.

4. A planar holder according to claim 1, further comprising a filing component formed integral with the frame.

5. A planar holder according to claim 4, wherein the filing component comprises hanging file hooks disposed at opposite ends of the frame.

6. A planar holder according to claim 4, wherein the filing component comprises binder apertures formed in the frame and spaced for insertion into a multi-ring binder.

7. A planar holder according to claim 1, wherein each of the catches comprises a securing ridge at an end of the catch that is spaced from the frame.

8. A planar holder according to claim 1, wherein the frame is formed of polypropylene.

9. A method of manufacturing a planar holder for a plurality of components, the method comprising injection molding a frame including a front side and a rear side, and forming a holding mechanism integral with the frame for supporting the plurality of components on the front side and the rear side of the frame, wherein the step of forming a holding mechanism comprises forming a plurality of catches on the front side and the rear side of the frame with respective pairs of the catches spaced apart to support respective ones of the components, each pair of the catches being formed to include a flexible catch and a fixed catch, forming each flexible catch with a flexible extension and a component securing panel, the component securing panel being attached to the flexible extension and disposed in a facing relationship with a corresponding fixed catch, wherein the flexible extension for a front side component is formed to extend from a surface of the frame toward the rear side, then toward the front side through an aperture in the surface of the frame and beyond the front side, and wherein the flexible extension for a rear side component is formed to extend from the surface of the frame toward the front side, then toward the rear side through an aperture in the surface of the frame and beyond the rear side.

10. A method according to claim 9, further comprising forming a filing component integral with the frame.

11. A planar holder for supporting a plurality of components, the planar holder comprising:

a molded frame having a front side and a rear side; and a plurality of compartments on the front side and the rear side of the frame, the compartments being defined by catches and securing ridges disposed on the front side and the rear side of the frame, the compartments being shaped corresponding to a shape of the plurality of components, wherein respective pairs of the catches are spaced apart to support respective ones of the components, each pair of the catches including a flexible catch and a fixed catch, wherein each flexible catch comprises a flexible extension and a component securing panel, the component securing panel being attached to the flexible extension and disposed in a facing relationship with a corresponding fixed catch, wherein the flexible extension for a front side component extends from a surface of the frame toward the rear side, then toward the front side through an aperture in the surface of the frame and beyond the front side, and wherein the flexible extension for a rear side component extends from the surface of the frame toward the front side, then toward the rear side throurgh an aperture in the surface of the frame and beyond the rear side.

\* \* \* \* \*